United States Patent [19]

Morrison

[11] 4,386,363

[45] May 31, 1983

[54] CHROMA KEY SWITCHING SIGNAL GENERATOR

[75] Inventor: Eric F. Morrison, Redwood City, Calif.

[73] Assignee: Ampex Corporation, Redwood City, Calif.

[21] Appl. No.: 252,864

[22] Filed: Apr. 10, 1981

[51] Int. Cl.³ .......................................... H04N 9/535
[52] U.S. Cl. .................................................... 358/22
[58] Field of Search ....................... 358/22, 30, 31, 39, 358/40, 183, 185

[56] References Cited

U.S. PATENT DOCUMENTS

| | | | |
|---|---|---|---|
| 4,021,841 | 5/1977 | Weinger | 358/22 |
| 4,041,527 | 8/1977 | Rayner | 358/22 |
| 4,051,520 | 9/1977 | Davidse | 358/22 |
| 4,122,490 | 10/1978 | Lish | 358/22 |
| 4,196,449 | 4/1980 | Tama | 358/22 |

OTHER PUBLICATIONS

Rawlings, R., "Chromakey in a Digital System," *International Broadcast Engineer*, Sep. 1980, pp. 30–31.
Davidse, J. and Koppe, R. P., "A Chroma-Key System Insensitive to Variations of the Background Illumination," *SMPTE Journal*, Mar. 1977, vol. 86, pp. 140–143.
Wright, R. C. H. and Fletcher, R. E., "Development of Operational Techniques Using C.S.O. (Chromakey) and Technological Developments That Could Effect a Change in Production Methods" International Broadcasting Convention, Sep. 25–29, 1978.
TRW Descriptive Brochure, Nov. 1977.

*Primary Examiner*—Michael A. Masinick
*Attorney, Agent, or Firm*—Fitch, Even, Tabin, Flannery & Welsh

[57] ABSTRACT

A wideband chroma key switching signal is generated from lower bandwidth chrominance signals in a video signal by first conventionally generating a chroma key switching signal from these chrominance signals, and then detecting high frequency transition components in the corresponding luminance signal. These luminance signal high frequency components are then added to the switching signal in a manner that insures that their polarities match, thereby generating a higher bandwidth chroma key switching signal. This resultant higher bandwidth chroma key switching signal is used to control cross fade amplifiers which function to output either the video signals of a first or a second scene with linear transitions between these video signals during switching.

9 Claims, 4 Drawing Figures

FIG. 2

CHROMA KEY SWITCHING SIGNAL GENERATOR

The present invention relates in general to systems for generating a chroma key switching signal, and, more particularly, to such a system wherein the bandwidth of the switching signal is improved from a bandwidth corresponding to the bandwidth of chrominance signals to a higher bandwidth as a function of high frequency components in the corresponding luminance signal, so long as high frequency components are present.

The technique known as chroma keying is well known in the art. Basically, chroma keying is a way of electronically switching between a first scene, generally termed the foreground scene, which is being viewed by a first camera, from a separate background scene viewed by a second camera. Conventionally, the foreground scene to be televised is arranged against a background which is painted in a saturated color that is otherwise absent in the foreground scene. The color most commonly used for this purpose is blue, since it is readily distinguishable from flesh tones. The function of the chroma key apparatus is to detect those portions of the foreground video signal which are highly saturated in the keying color and then, by means of an electronic switch, to replace such portions with corresponding portions of the background scene. It is the means by which this color detection is made and the manner in which the two video signals are switched that determines the quality of the resultant keying. As can be seen, the chroma key switching circuit must continuously decide whether or not the foreground scene video signal corresponds to the foreground scene intended to be viewed or the saturated colored background to be switched out.

Chroma keying is commonly used in a television studio during presentation of live news programs, or the like. For this application, however, the technical performance required of the chroma keyer is not particularly stringent and, in addition, the lighting for the colored keying surface and the foreground content material can be kept within fairly tight limits. In other applications for chroma keying, however, currently available keyers have been found to be less satisfactory. In certain special effect applications, where it is important to have a higher quality resultant keying signal, or wherein the keying is being done in a post-production facility where the keying signal must be derived from a video signal contained, for example, on a video tape or originating from some other video source, problems have occurred. Where the bandwidth of the video signals have been reduced, or the scene was not stringently formatted for chroma keying, defects such as edge jitter color fringing, foreground color spillage, or a cardboard cutout effect caused by sharp keying transitions, are the result.

In a studio environment, the chroma keying apparatus usually is fed high bandwidth red, green, and blue (RGB) signals output directly from the cameras. Thus, in theory, frequencies up to 5.5 MHz are available for the chroma keyer detection circuitry. In practice, however, the signal-to-noise performance of most cameras deteriorates at higher frequencies. In addition, the camera is generally arranged to produce maximum sensitivity, i.e. the greatest wideband signal-to-noise ratio, in the luminance channel, $E_Y$, which is conventionally derived from the RGB signals, as compared to the color difference channels, the chrominance channels $E_{R-Y}$ and $E_{B-Y}$. This is usually justified by the fact that the color difference signals are ultimately encoded as NTSC, PAL, or SECAM formatted video signals at significantly less bandwidth than the luminance signal, e.g. a luminance bandwidth 5.5 MHz as compared with a chrominance bandwidth of 1.3 MHz.

Narrower-band chrominance signals cause ambiguous chroma key switching where high frequency components present in the original color signal have been lost due to this predetermined reduction in chrominance signal bandwidth. Further, if these chrominance signals are derived from the encoded NTSC, or some other composite analog signal, the additional noise introduced by this prior encoding process, such as chroma noise from a video tape recorder or from some high frequency noise source, such as a microwave radio link, may completely mask the chrominance transitions. This would make it impossible to perform a satisfactory chroma keying operation, even though the luminance signal-to-noise ratio and bandwidth usually has not been impaired by such analog processes.

In addition, in the proposed new world-wide digital component standard for television signals, the chrominance information is defined to exist at a lower bandwidth, as compared to the luminance. However, at least this chrominance information is not multiplexed with the luminance information, as the case with current analog encoding standards. Thus, the digitized chrominance signals are not subject to any further distortion, and are therefore much more adaptable to post-production processing with chroma keying or the like. Problems of designing a digital chroma keyer are discussed in "Chromakey in a Digital System," by R. Rawlings, International Broadcast Engineer, September 1980, at p. 30.

As will be described in detail, the apparatus disclosed herein provides means for improving the bandwidth of the chroma key switching signal as a function of high frequency components in the luminance signal which correspond to color transitions in the chrominance signals used to generate the chroma key switching signal. More specifically, a signal consisting of the high frequency components of the luminance signal is derived and its polarity sensed with respect to the polarity of the corresponding transitions in the chrominance signals. This is so that these high frequency components can each be inverted if necessary to correspond to the polarity of the respective chrominance signal transition. The resultant high frequency components are then added to the conventionally derived chroma key switching signal to produce a chroma key switching signal of improved bandwidth.

The proper operation of the present invention assumes that a luminance transition occurring at the same time as a chrominance transition represents the high frequency component of the original color transition in the scene, rather than merely a change in the illumination of the scene. A second assumption is that all high frequency luminance signals occurring during a chrominance color transition to or from the background saturated color reflect the original color of the scene.

Accordingly, it is an object of the present invention to provide an improved chroma keyer wherein the chroma key switching signal generated by the keyer, although derived from chrominance signals of narrowed bandwidth, is improved as a function of the corresponding wideband luminance signal.

Another object of the present invention is to increase the bandwidth of the chroma key switching signal so as to enable improved post-production chroma keying to thereby approximate the accuracy of chroma keying with a live full bandwidth video signal.

Yet another object of the present invention is to provide a chroma key switching signal generator adapted for operation on television signals in digital component form wherein the chrominance signals have been limited in bandwidth only, with essentially no other distortions added to these signals when they are converted to this digital form.

These and other objects and advantages of the present invention will become more apparent upon reference to the accompanying drawings and the following description, in which:

Figure 1:
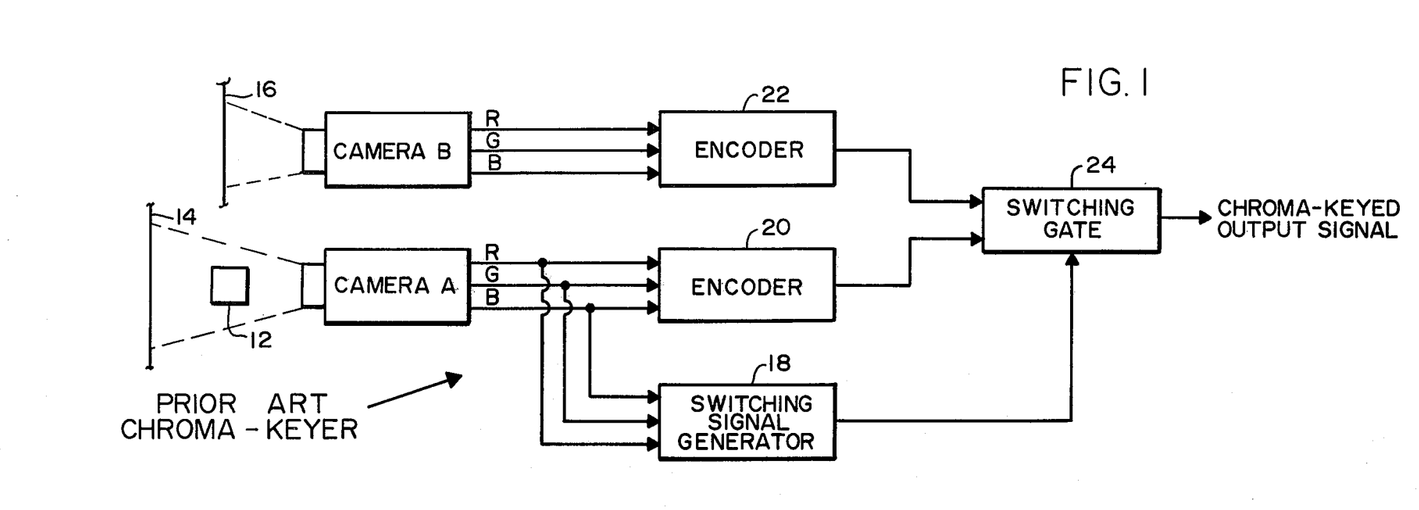
FIG. 1 is a block diagram of a prior art chroma key system.

Referring now to the figures, FIG. 1 illustrates a conventional prior art chroma keyer for generating a switching signal when a certain color is detected. As seen in FIG. 1, camera A generates a video signal of a foreground scene 12 which is positioned in front of a background 14. Background 14 is painted in a saturated color that is defined to be absent in the foreground scene 12. Camera B generates a video signal of a background scene 16 which is to be switched in by the chroma keyer in place of the background 14. The RGB video output of camera A is fed to a chroma key switching signal generator 18 in addition to an encoder 20. The RGB video output of camera B is fed to an encoder 22. These encoders 20, 22 are designed to conventionally encode the RGB signals into the color television standard format used in that locale, whether it be NTSC, PAL, SECAM, or some other color television standard.

The output encoded video signals from encoders 20 and 22 are fed to a switching gate 24 which is controlled by the output of the chroma key switching signal generator 18. Switching gate 24 gates off the output of encoder 20 and replaces it with the output of encoder 22 when a switching signal from generator 18 is received. The output of gate 24 is thus a chroma keyed output signal, wherein scene 12 appears in the foreground and scene 16 appears in the background of the composite video picture. This version of a chroma keyer is used with most present day switching systems and special effects units.

The drawback of this system is that, since the video signals switched by the switching gate are encoded signals, by definition the chrominance signal components of these encoded signals are at a lower bandwidth than the luminance signals. Consequently, to avoid serious cross-color components in the final output signal, the switching speed of switching gate 24 must not exceed the chrominance signal bandwidth. This is because no color separation information exists at any higher frequency than the frequency of the chrominance bandwidth.

A similar problem would exist in a system wherein the already encoded television video signals are decoded to obtain the luminance and chrominance information needed by the chroma key switching signal generator. In addition to the bandwidth limitations of the chrominance signals, additional distortion is injected due to the encoding and decoding process. These latter distortions have generally made post-production special effects processing of video signals impractical due to the inferiority of the results obtained.

Figure 2:
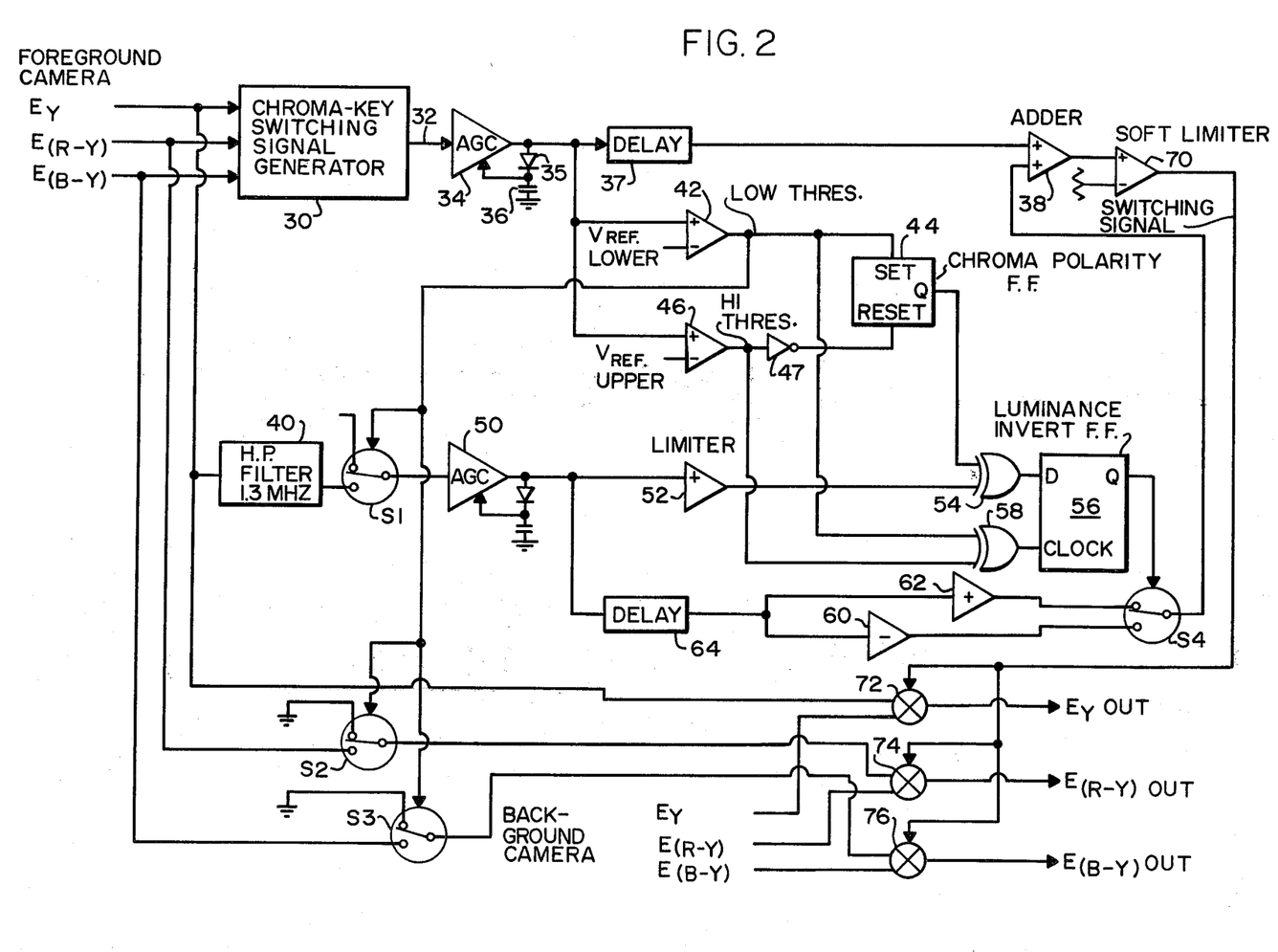
FIG. 2 is a block diagram of a chroma key system according to the present invention.

The present invention is illustrated in block diagram form in FIG. 2. As seen in FIG. 2, the luminance signal, $E_Y$ and the two chrominance signals $E_{R-Y}$ and $E_{B-Y}$ are fed to a conventional chroma key switching signal generator 30. Although the present invention is shown as operating from these three signals, it should be understood that these signals can be either analog or digital component signals and can be derived from live RGB signals or from a recorded video source, or even from decoded NTSC or other television standard encoded video signals. It is assumed that the luminance signal is a wideband signal of, for example, 5.5 MHz, whereas the two chrominance signals are of a more narrower bandwidth, e.g. 1.3 MHz.

As described in more detail hereinbelow with respect to FIG. 4, the chroma key signal generator 30 is preferably a chromaticity based system that functions independent of the luminance amplitude. The advantage of such a system is that sensitivity to the illumination of the background portion of a foreground scene are considerably lessened, with a resultant reduced risk of false keying on dark parts of the scene.

The key signal generated by signal generator 30 is output on line 32. This signal is conventionally "one," at a high voltage level when the saturated color of the background is detected, and "off," at a low voltage level, when the foreground scene is detected. The frequency response of this key signal, i.e. the speed of transition between a high and a low state in response to the detection of a color transition in the scene from the foreground scene to the background saturated color, or vice versa, is limited to the bandwidth of the chrominance signals. This is because, as mentioned above, the higher frequency components of the color difference signals are no longer a part of the chrominance signals. According to the present invention, the key signal on line 32 provides two functions. Transitions in the key signal are used to provide means for grating, through a first switch, those high frequency components of the corresponding luminance signal that occur during such transition periods, and means for inverting the slope of any such high frequency components that are of opposite polarity to the slope of the corresponding transition. Secondly, the key signal on line 32 as modified by amplifier 34 is added to the resultant luminance high frequency components in an adder 38, as described in more detail below.

To format the key signal for the above described operations, it is first fed to a limited range conventional gain control (AGC) amplifier 34. Amplifier 34 is designed to maintain the peak output of the key signal at a constant level independent of any variation in foreground scene brightness or illumination that may exist. Diode 35 rectifies the output of amplifier 34, and feeds this signal to a capacitor 36 which defines the time constant of amplifier 34 in a conventional manner. The output of amplifier 34 is fed to a conventional delay network 37, and thereby to an adder 38. Delay 37 can be implemented with an L-C delay line, a low pass filter, or the like. Delay 37 provides sufficient delay, e.g 135 nanoseconds, to insure that the signal output from delay 37 to adder 38 arrives at the same time as the other signal input to adder 38. As described in detail below, this other signal comprises the frequency components of the luminance signal which are detected as having occurred simultaneously with the chrominance signals transitions. Delay 37 thus enables the timing of the key signal to correspond to this frequency components signal, such that accurate addition of these signals is obtained.

A signal consisting of the high frequency components of the luminance signal is generated in the following manner. The wideband luminance signal $E_Y$ is fed through a high pass filter 40 which functions to pass all high frequency components of the luminance signal above the bandwidth of the chrominance signals. Thus, if the chrominance bandwidth is 1.3 MHz, this high pass filter would operate to pass all high frequency components of the luminance signal above this frequency. Thus, high pass filter 40 acts to pass the high frequency portion of the color transitions which were eliminated from the chrominance signals during the low pass filter operations that occur when such narrower-band signals are generated.

The output of high pass filter 40 is fed to a switch S1. Switch S1, and other similar switches described herein, is a conventional analog switch which has a switching speed on the order of 100 nanoseconds. Switch S1 functions to gate through the high frequency components of the luminance signal generated by high pass filter 40 only during a specific time controlled by key signal. This operation is performed by a threshold detector 42. The key signal as output from gain control amplifier 34 is fed to one input of threshold detector 42, while the other input of detector 42 is tied to a first voltage reference source (Vref. lower) of a sufficiently low predetermined voltage such that the output of threshold detector 42 goes high as soon as the key signal is above a low level voltage that is just above the noise region of the key signal when it is in its off state. The output of detector 42 has a much faster frequency response than the response time of the key signal, such that the output switching signal generated by threshold detector 42 substantially overlaps the key signal. This signal causes switch S1 to switch state. Thus, substantially all high voltage components of the luminance signal that occur from the time that the key signal is beginning to turn on at a lower threshold, to when, at the end of the key signal, the voltage level thereof again passes through this lower voltage threshold are enabled to be coupled across switch S1. The result is that high frequency components of the luminance signal occuring in the transition period between the low threshold point of the key signal and a high threshold point thereof are coupled through switch S1.

The switching signal output by threshold detector 42 also is fed to the set input of a chroma polarity flip-flop 44. Flip-flop 44 changes state and goes low when this output signal goes high, as it does not change state in response to detector 42 until the end of the key signal pulse. The reset side of the chroma polarity flip-flop 44 is fed from a second threshold detector 46 which has the same key signal input thereto. The other input to threshold detector 46 is an upper level voltage reference (Vref. Upper), whose level is set just below the noise level of the high voltage level of the key signal. Thus, the output of threshold detector 46 is a pulse whose leading edge occurs just before the key signal as amplified by amplifier 34 reaches its high constant level and whose trailing edge occurs just as the voltage level of the key signal drops a threshold level below its high level.

With the output of threshold detector 46 high, it is fed through an inverter 47 to the chroma polarity flip-flop 44 to cause the flip-flop 44 to go off just as the key signal is completing its transition to an on state. Thus, the output of flip-flop 44 is high until the output of threshold detector 46 goes on, and, thereafter, remains low until the output of threshold detector 42 goes low at the end of the key signal pulse interval.

The high frequency components of the luminance signal which are passed through switch S1 are fed to another gain control amplifier 50 whose purpose is to maintain the same output amplitude on the high frequency components of the luminance signal as the key signal output by amplifier 34. The output of amplifier 50 is fed first to a limiter 52 which functions to generate a logic signal in response to the high frequency components. The output of limiter 52 is ambiguous except when a high frequency component signal exists, at which time it outputs either a square wave that is first a one and then a zero, or, alternatively, a zero and then a one depending on the polarity of the high frequency component signal. The logic signal output of limiter 52 is fed to an exclusive-OR gate 54 whose other input is the output of the chroma polarity flip-flop 44. Exclusive-OR gate 54 is the D input to a luminance invert flip flop 56. Thus, exclusive-OR gate 54 acts as a means for generating a first logic level if the polarity of the high frequency components is one direction with respect to the present state of flip-flop 44 and a second logic level if the polarity of the high frequency component is opposite to flip-flop 44, and since the input to exclusive-OR gate 54 from flip-flop 44 is in a different state depending on whether it is a rising or trailing edge transition of the key signal, this provides means for ensuring that the polarity of the high frequency component is reflected in the output of gate 54.

The clock input to luminance invert flip-flop 56 is generated by a second exclusive-OR gate 58 whose inputs are the signals from each of the threshold detectors 42 and 46. The output of exclusive-OR gate 58 is a rising edge pulse at the beginning of either the leading edge transition period or the trailing edge transition period of the key signal 32. Consequently, the output state of the luminance invert flip-flop 56 is updated at the beginning of each such transition interval as a function of the present state of the output of exclusive-OR gate 54.

The output signal from flip-flop 56 control the state of an analog switch S4. The switchable inputs to switch S4 are opposite polarity versions of the high frequency component signals of the luminance signal. These signals are generated respectively by means of inverting and non-inverting amplifiers 60 and 62 which are fed from a second delay network 64. Delay 64 is another conventional delay needed to match up the high frequency component signals with the processing delays of the above described circuitry in a similar manner as the key signal was delayed via delay 37. Thus, the output of switch S4 is either a positive polarity or a negative polarity version of the high frequency component of a luminance signal existing at a given time, as a function of the present state of the luminance invert flip-flop 56. That is, with the output of luminance flip-flop 56 high, this corresponds to an instruction to not invert the high frequency component signal existing at that time so that the swinger arm of switch S4 is coupled to non-inverting amplifier 62. Conversely, with the output of flip-flop 56 low, indicating that the high frequency component signal needs to be inverted, this causes the swinger arm of switch S4 to be coupled to inverting amplifier 60.

The high frequency component signals output from switch S4 thus represent directly the high frequency portion of the color video signal transitions, assuming such transitions in fact exist in the luminance signal. Further, the signals output through switch S4 are now of a polarity that corresponds to the polarity of transitions of the key signal. Thus, when these high frequency component signals are added to the key signal, by means of adder 38, the resultant signal is a key signal whose rising and trailing transition edges are representative of the high frequency transitions of the luminance signal rather than the lower frequency transitions of the chrominance signals.

The output of adder 38 is fed to a soft limiter amplifier 70. Soft limiter amplifier 70 linearizes the signal that is output by adder 38 and gets rid of any higher frequency noise which may now exist on this signal. That is, the transition portions of the key signal are linearized by soft limiter amplifier 70, to provide a wideband chroma key switching signal whose transition edges are linear, thereby enabling linear switching between the foreground scene and the background scene.

The switching means for performing this final switching step is provided by conventional cross fade video amplifiers 72, 74 and 76. These amplifiers function respectively, to switch between the luminance and chrominance signals of the foreground and background scenes as a function of the present state of the augmented key signal output from amplifier 70. The amplifiers are called cross fade amplifiers, since they are designed to provide a fade out of one scene and a fade in of another scene at a controlled rate that is proportional to the linearized slope of the key signal transitions. This operation minimizes any distortions in this transitional area which might otherwise be seen on the output video.

The foreground scene chrominance signals are also preferably switched off as soon as the key signal begins to be generated, as indicated by the turning on of threshold detector 42. Thus, threshold detector 42 also acts as a gating means to control the coupling of the foreground chrominance signals to respective cross fade amplifiers 74 and 76 only when none of the saturation color is being detected by the chroma key switching signal generator 30. The advantage of this switching means is that it eliminates the chroma components of the saturated color before the cross fade amplifiers act to fade out these signals, and thus prevent color fringing which would otherwise appear in the output video picture at the keyed edge.

Figure 3:
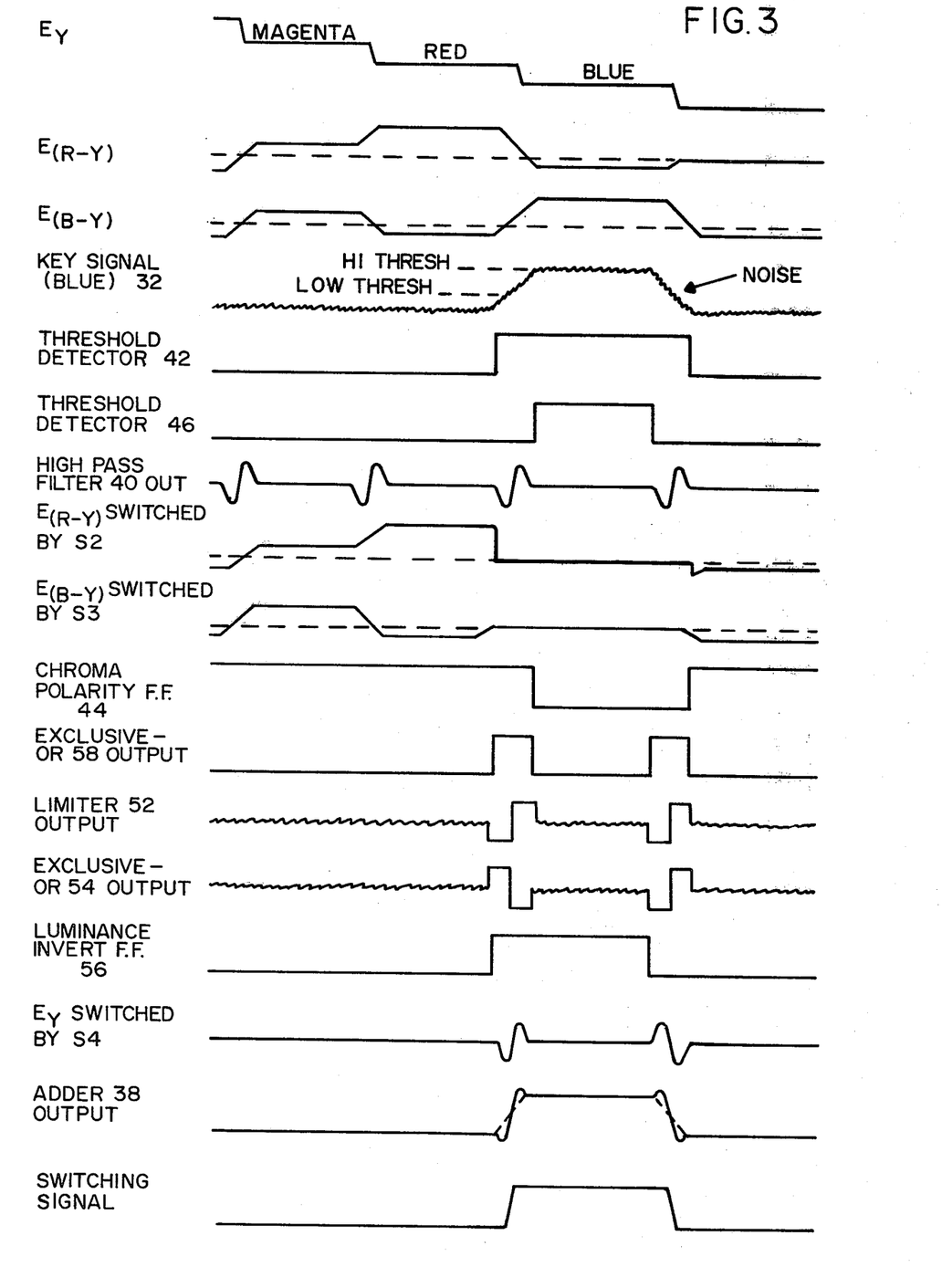
FIG. 3 is a timing diagram illustrating the operation of the chroma key apparatus of FIG. 2.

FIG. 3 illustrates a timing diagram of the above described apparatus of FIG. 2. For clarity, the circuit is shown functioning with a luminance signal $E_Y$ that varies between three luminance levels corresponding to the colors magenta, red and blue, and two exemplary chrominance signals $E_{R-Y}$ and $E_{B-Y}$ which occur at the times shown corresponding to the luminance signal. Note initially that the slope of the transition between colors in a luminance signal are much faster, as a result of the wider bandwidth of the luminance signal, than the corresponding transitions of the narrower-band chrominance signals. The key signal output is shown as being generated in response to the detection of a saturated blue color in the chrominance signals $E_{R-Y}$ and $E_{B-Y}$. High frequency noise is common on these chroma key switching signals, as shown. Also shown are the lower and upper threshold points of the key signal which are sensed, respectively, by threshold detectors 42 and 46. The output of threshold detector 42 and threshold detector 46 are shown beneath the exemplary key signal, and illustrate that threshold detector 42 remains on and overlaps substantially all of the key signal, whereas threshold detector 46 is on only while the key signal is above its upper threshold point. Next is illustrated the output of high pass filter 40, the high frequency components of the color transitions of the exemplary $E_Y$ luminance signal, the top curve of the timing diagram. Next is illustrated the chrominance signal $E_{R-Y}$ as output through switch S2 and $E_{B-Y}$ as output correspondingly through switch S3. As is clearly seen, these outputs go to zero while threshold detector 42 is on, thereby minimizing color finging during keying in of the background scene.

The operation of the chroma polarity flip-flop 44 is shown and indicates that this flip-flop goes low when the key signal first exceeds the upper threshold and remains low until the trailing edge transition of the key signal has just about ended. The clock output of exclusive-OR gate 58 is shown, with the rising edge of this signal causing the luminance inverter flip-flop 56 to update its present output state as a function of its D input. This D input is fed from the output of exclusive-OR gate 54. Note that the output of exclusive-OR gate 54 is ambiguous except when high frequency component transitions are detected and the threshold detector 42 is on. This results from the operation of limiter 52, as shown, which takes the high frequency components as output by high pass filter 40, and generates a logic signal when such components are present, and an ambiguous output at all other times.

The function of switch S4 is illustrated, and indicates that the polarity of any high frequency component of the luminance signal can be inverted depending on the present state of the luminance inverter flip-flop 56, and such that the high frequency components are caused to match the polarity of transitions in the key signal. The output of adder 38 is shown, illustrating an exemplary sum of the high frequency components of the luminance signal and the original narrower bandwidth chroma key signal. Finally, the output switching signal output by soft limiter 70 is shown. With the transition edges of the key signal now linearized, as is seen, the transition rate of the key signal has now been substantially improved, to an extent so as to be substantially equal to the wideband frequency response of the luminance signal.

As is therefore clear, these faster transition edges enable chroma keying with chrominance signals bandwidth would otherwise make such chroma keying unsatisfactory, as in post-production chroma keying wherein the chrominance signals have been stored on a video tape or otherwise reduced in bandwidth as compared to the corresponding luminance signals.

Figure 4:
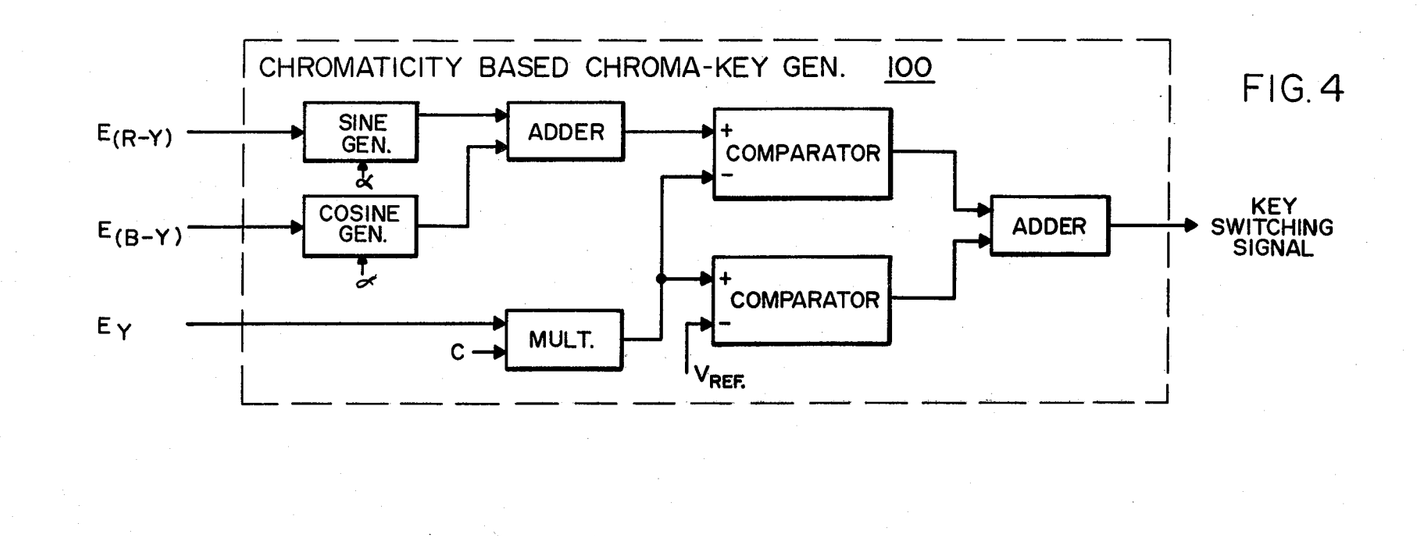
FIG. 4 illustrates an exemplary chromaticity keyer used in the preferred embodiment of the chroma key apparatus of FIG. 2.

FIG. 4 illustrates a chromaticity based chroma key generator 100 useable as a chroma key switching signal generator 30 according to the present invention. As mentioned above, the advantages of a chromaticity base chroma key generator are that the effect of variations in the illumination of the saturated color background are substantially reduced. As a result, false keying in the scene portions of the signal and the absence of proper keying in the background of the signal are avoided. The problem with prior art chroma keyers such as illustrated in FIG. 1 is that the chroma key switching signals depend not only on the hue and saturation of a color, but also on its luminance. Thus, any variation in the background luminance may affect the keying. To prevent the need for overly careful illumination of the scene, it is desired that the chroma key switching be derived from a luminance independent chrominance signal, a chromaticity based signal generation means.

As described in the paper "A Chroma-key System Insensitive to Variations of the Background Illumination," by J. Davidse and R. P. Koppe, SMPTE Journal, Vol. 86, Mar. 19, 1977, at p. 140, such a chromaticity based generator would be obtained as shown by the following equation:

$$(E_{R-Y}) \sin \alpha + (E_{B-Y}) \cos \alpha \geq CE_Y$$

The block diagram of FIG. 4 illustrates a chroma key system working on the above principle, with Vref. being fed to one of the comparators to provide a minimum level governed by the noisiness of the camera signals. This comparator prevents noise from generating a chroma key signal in a dark part of the scene. That is, this comparator blocks generation of a key switching signal if the luminance is below a predetermined threshold value.

It is of course understood that although a preferred embodiment of the present invention has been illustrated and described, various modifications, alternatives, and equivalents thereof will become apparent to those skilled in the art and, accordingly, the scope of the present invention should be defined only by the appended claims and equivalents thereof.

What is claimed is:

1. In a television system having a video signal including wideband luminance and narrower-band chrominance signals, means for generating a wideband chroma key switching signal comprising:
    means for generating a narrower-band chroma key switching signal from said chrominance signals;
    means for generating a further signal consisting of high frequency components of said luminance signal corresponding to the transitions of said narrower-band chroma key switching signal; and
    means responsive to said means for generating said further signal for adding said components to said narrower-band chroma key switching signal.

2. In a television system having a video signal including wideband luminance and narrower-band chrominance signals, means for generating a wideband chroma key switching signal comprising:
    means for generating a narrower-band chroma key switching signal from said chrominance signals;
    means for generating a further signal consisting of high frequency components of said luminance signal corresponding to the transitions of said narrower-band chroma key switching signal, and including means for comparing the polarity of said high frequency components with said corresponding chroma key switching signal transitions, and means for inverting any said components of opposite polarity to said corresponding chroma key switching signal transitions; and
    means responsive to said means for generating said further signal for adding said components to said narrower-band chrom key switching signal, generating thereby a wideband chroma key switching signal.

3. In a television system including a first video signal representing a foreground scene and a second video signal representing a background scene, means for generating a wideband chroma key switching signal from narrower-band chrominance signals in said first video signal, said switching signal controlling switching between said foreground scene and said background scene, comprising:
    means for generating a narrower-band chroma key switching signal from the chrominance signals derived from said first video signal;
    means for generating a further signal consisting of high frequency components of the luminance signal derived from said first video signal corresponding to the transitions of said narrower-band chroma key switching signal, and including means for comparing the polarity of said high frequency components with said corresponding chroma key switching signal transitions, and means for inverting any said components of opposite polarity to said corresponding chroma key switching signal transitions, and means for inverting any said components of opposite polarity to said corresponding chroma key switching signal transitions;
    means responsive to said means for generating said further signal for adding said high frequency components to said narrower-band chroma key switching signal, and for generating a wideband chroma key switching signal; and
    means for switching between said foreground scene and said background scene as a function of said wideband chroma key switching signal.

4. The television system of claim 2 or 3 wherein said means for generating said narrower-band chroma key switching signal comprises means for generating a chromaticity based switching signal that is substantially independent of illumination variations in said luminance signal.

5. The television system of claim 2 or 3 wherein said polarity comparing means comprises:
    low threshold detector means for detecting when the level of said narrower-band chroma key switching signal exceeds a predetermined lower voltage reference level;
    high threshold detector means for detecting when the level of said narrower-band chroma key switching signal exceeds a predetermined upper voltage reference level;
    polarity flip-flop means operative to switch to a first state when said upper threshold detector means detects that said key switching signal exceeds said upper voltage reference, and operative to switch to a second state when said lower threshold detector means detects that said key switching signal does not exceed said lower voltage reference;
    high pass filter means for generating high frequency components of said luminance signal;
    gating means responsive to said low threshold detector means for outputting those high frequency components that occur while said key switching signal exceeds said lower reference voltage; and
    means responsive to the present state of said polarity flip-flop for outputting a logic level that is a function of the polarity of said high frequency components with respect to said present state of said polarity flip-flop.

6. The television system of claims 2 or 3 wherein said inverting means comprises:
   luminance inverter flip-flop means, responsive to said polarity comparison means during the transition period of said key switching signal, for outputting an invert command signal when the polarity of a high frequency component is opposite to the polarity of said corresponding key switching signal transition;
   means for inverting each said high frequency component; and
   gate means responsive to said command signal for gating off said high frequency component and for gating out said inverted high frequency component.

7. The television system of claims 2 or 3 wherein said means for generating said further signal further comprises delay means for causing said high frequency components and said narrower-band chroma key switching signal to be coupled substantially simultaneously to said adding means.

8. The television system of claim 3 wherein said switching means comprises:
   threshold detector means for detecting when the level of said narrower-band chroma key switching signal exceeds a predetermined voltage reference level; and
   gating means responsive to said threshold detector means for gating off said foreground scene chrominance signals while said key switching signal exceeds said voltage reference.

9. The television system of claim 3 wherein said switching means comprises cross fade amplifier means for providing a linear switching transition between the video signals of, respectively, said foreground scene and said background scene that is proportional to the transition slope of said wideband chroma key switching signal.

* * * * *

UNITED STATES PATENT AND TRADEMARK OFFICE
CERTIFICATE OF CORRECTION

PATENT NO. : 4,386,363

DATED : May 31, 1983

INVENTOR(S) : Eric F. Morrison

It is certified that error appears in the above-identified patent and that said Letters Patent are hereby corrected as shown below:

Column 5, line 57, "low should read --high--;

Column 5, line 58, "high" should read --low--;

Column 9, line 17, "$\geq$" should read --$>$--

Column 10, line 35, "claim" should read --Claims--.

Signed and Sealed this

Twentieth Day of August 1985

[SEAL]

Attest:

DONALD J. QUIGG

Attesting Officer    Acting Commissioner of Patents and Trademarks